US012677100B2

(12) United States Patent
Straeussnigg

(10) Patent No.: US 12,677,100 B2
(45) Date of Patent: Jul. 7, 2026

(54) ADAPTIVE DIGITAL NON-LINEARITY COMPENSATION ON A SILICON MICROPHONE

(71) Applicant: Infineon Technologies AG, Neubiberg (DE)

(72) Inventor: Dietmar Straeussnigg, Villach (AT)

(73) Assignee: Infineon Technologies AG, Neubiberg (DE)

( * ) Notice: Subject to any disclaimer, the term of this patent is extended or adjusted under 35 U.S.C. 154(b) by 419 days.

(21) Appl. No.: 17/654,469

(22) Filed: Mar. 11, 2022

(65) Prior Publication Data

US 2023/0292057 A1 Sep. 14, 2023

(51) Int. Cl.

*H04R 19/04* (2006.01)
*H04R 3/04* (2006.01)
*H04R 19/00* (2006.01)

(52) U.S. Cl.

CPC ............... *H04R 19/04* (2013.01); *H04R 3/04* (2013.01); *H04R 19/005* (2013.01); *H04R 2430/00* (2013.01)

(58) Field of Classification Search

None

See application file for complete search history.

(56) References Cited

U.S. PATENT DOCUMENTS 6,570,514 B1 5/2003 Velazquez
7,053,709 B1 * 5/2006 Darvish-Zadeh ..... H03F 1/3241 330/136
8,718,209 B2 5/2014 Lozhkin
9,716,933 B2 7/2017 Oliaei
10,594,329 B1 3/2020 Elkholy
10,848,173 B2 11/2020 Kim
11,463,072 B1 10/2022 Velazquez
12,009,745 B2 * 6/2024 Sreenivas ............. H02M 1/084
2007/0176805 A1 8/2007 Stewart
2007/0253510 A1 * 11/2007 Danz ..................... H04L 27/364 375/E7.002
2008/0178671 A1 * 7/2008 Miller ................... G01P 15/125 73/488
2009/0027117 A1 1/2009 Andersen
2010/0166216 A1 * 7/2010 Chambers ................ H04R 3/04 381/94.9
2012/0140942 A1 * 6/2012 Loeda .............. G10K 11/17885 381/71.11
2013/0021098 A1 * 1/2013 Gerstenhaber ........ H03F 1/3247 330/254

(Continued)

*Primary Examiner* — Duc Nguyen
*Assistant Examiner* — Assad Mohammed
(74) *Attorney, Agent, or Firm* — Slater Matsil, LLP

(57) ABSTRACT

A linearized system includes a nonlinear system configured for receiving an input signal; a digital nonlinear compensation component having an input coupled to an output of the nonlinear system, and having an output for generating an output signal; a low pass filter having an input coupled to the output of the digital nonlinear compensation component; a first summer having a first input configured for receiving a digital reference value and a second input coupled to an output of the low pass filter; and an error minimization component having an input coupled to an output of the first summer, and an output coupled to the digital nonlinear compensation component.

15 Claims, 10 Drawing Sheets

(56) References Cited

U.S. PATENT DOCUMENTS

| | | | | |
|---|---|---|---|---|
| 2014/0002042 | A1* | 1/2014 | Wismar | H02M 3/157 323/282 |
| 2014/0369537 | A1* | 12/2014 | Pontoppidan | H04R 25/606 381/314 |
| 2015/0131819 | A1 | 5/2015 | Straeussnigg et al. | |
| 2015/0271585 | A1* | 9/2015 | Straussnigg | H04M 1/12 381/369 |
| 2015/0319529 | A1 | 11/2015 | Klippel | |
| 2016/0087604 | A1 | 3/2016 | Kim | |
| 2016/0191020 | A1 | 6/2016 | Velazquez | |
| 2016/0344358 | A1 | 11/2016 | Oliaei | |
| 2020/0162099 | A1 | 5/2020 | Perrott | |
| 2024/0072831 | A1 | 2/2024 | Morche | |

* cited by examiner

ADAPTIVE DIGITAL NON-LINEARITY COMPENSATION ON A SILICON MICROPHONE

TECHNICAL FIELD

The present invention relates generally to adaptive digital non-linearity compensation on a silicon microphone and a corresponding system.

BACKGROUND

Generally, silicon microphones (also referred to as "digital microphones") include an analog-to-digital converter (ADC) for converting an analog signal from a micro-electro-mechanical system (MEMS) device into a digital signal. The digital signal also includes noise generated by the ADC, which affects the signal-to-noise ratio (SNR) of the digital microphone. The digital signal also includes nonlinearities caused by both the ADC and the MEMS device, which affects the distortion of the digital microphone.

Market trends regarding digital microphones compel higher SNRs and lower distortion levels. In the design of traditional microphone systems, solutions for improving either of these two specifications are usually inversely correlated. This leads to a trade-off between improving SNR and improving distortion. Thus, improving SNR of the microphone will generally result in increased distortion levels, whereas improving linearity of the microphone will generally result in a lower SNR.

SUMMARY

According to an embodiment, an apparatus includes a nonlinear system configured for receiving an input signal; a digital nonlinear compensation component having an input coupled to an output of the nonlinear system, and having an output for generating an output signal; a low pass filter having an input coupled to the output of the digital nonlinear compensation component; a first summer having a first input configured for receiving a digital reference value and a second input coupled to an output of the low pass filter; and an error minimization component having an input coupled to an output of the first summer, and an output coupled to the digital nonlinear compensation component.

According to an embodiment, an apparatus includes a nonlinear system configured for receiving an input signal; a first low pass filter having an input coupled to an output of the nonlinear system; a first summer having a first input coupled to an output of the first low pass filter, and having a second input coupled to the output of the nonlinear system; a digital nonlinear compensation component having an input coupled to an output of the first summer, and having an output for generating an output signal; a second low pass filter having an input coupled to the output of the digital nonlinear compensation component; a second summer having a first input coupled to of the first low pass filter, and having a second input coupled to an output of the second low pass filter; and an error minimization component having an input coupled to an output of the second summer, and an output coupled to the digital nonlinear compensation component.

According to an embodiment, a method includes converting an analog signal into a digital signal, wherein the analog signal includes nonlinearities; compensating the digital signal using a nonlinear transfer function fitted to the nonlinearities in the analog signal to provide a linearized digital signal; generating an error voltage from the linearized digital signal; reducing the error voltage to generate a reduced error voltage; and updating the nonlinear transfer function with the reduced error voltage.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
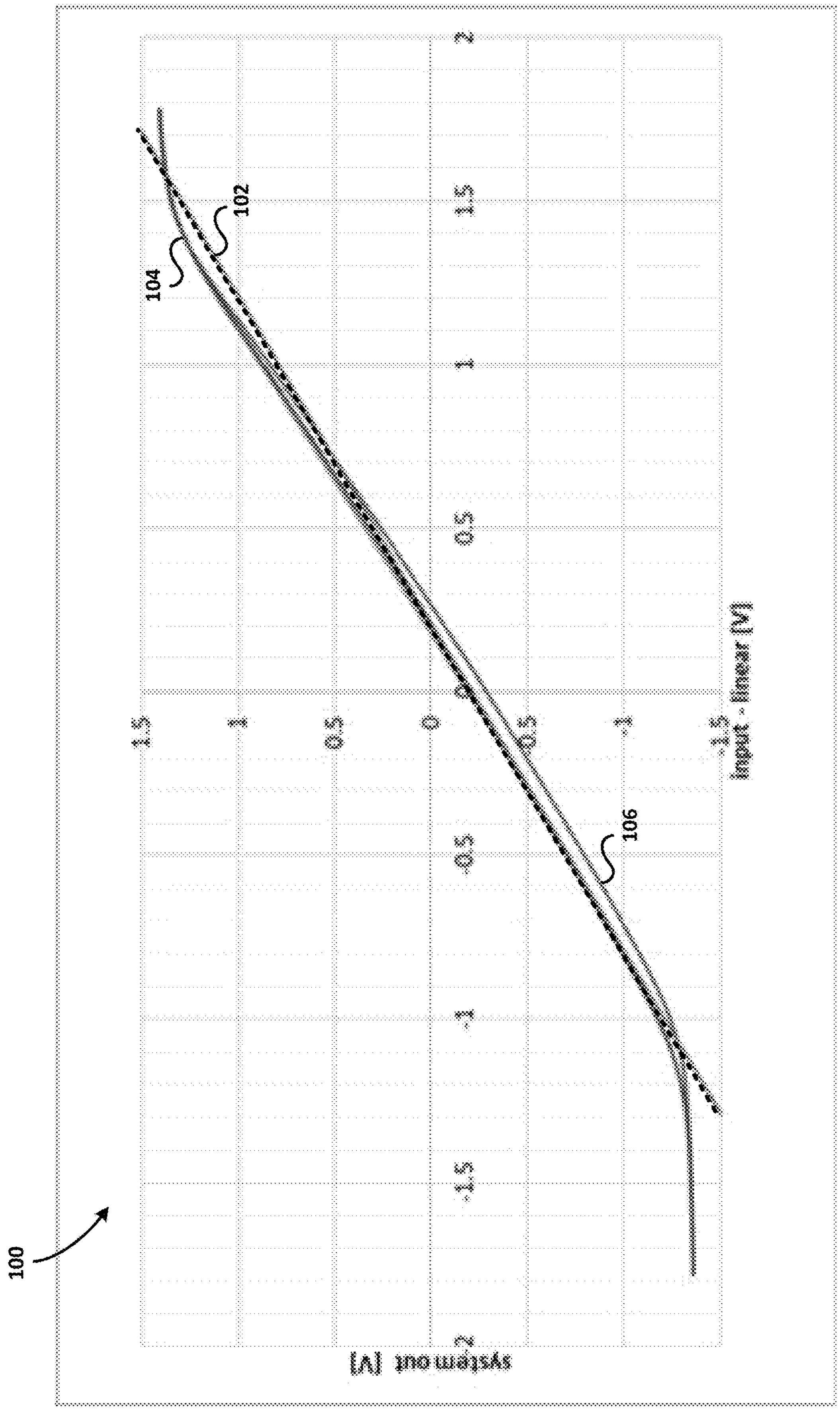
FIG. 1 is an example of an input voltage/output voltage diagram showing the non-linearity of a microphone system compared to ideal linear performance.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In the following detailed description, reference is made to the accompanying drawings, which form a part hereof and in which are shown by way of illustrations specific embodiments in which the invention may be practiced. It is to be understood that other embodiments may be utilized and structural or logical changes may be made without departing from the scope of the present invention. For example, features illustrated or described for one embodiment can be used on or in conjunction with other embodiments to yield yet a further embodiment. It is intended that the present invention includes such modifications and variations. The examples are described using specific language, which should not be construed as limiting the scope of the appending claims. The drawings are not scaled and are for illustrative purposes only. For clarity, the same or similar elements have been designated by corresponding references in the different drawings if not stated otherwise.

According to embodiments, an apparatus and method for digital systems such as a digital microphone allows lowering distortion without impacting the SNR of the system. Improvements in the system SNR can thus be made independently from distortion specifications and leads to an overall enhancement of system performance. The non-linearity generated by the system from both the MEMS device and the readout circuit is compensated in the digital signal processing path through a nonlinear compensation component that is described below. Various embodiments of the nonlinear compensation component are described in further detail in co-pending U.S. patent application Ser. No. 17/675,801, entitled "Digital Non-Linearity Compensation in a Silicon Microphone" that is hereby incorporated by reference in its entirety. The nonlinear compensation component can include open loop embodiments and closed loop embodiments. For example, in an open loop embodiment, a non-linear correction function, such as a polynomial function can be applied to the digitized output of the MEMS device and readout signal in order to linearize the signal. In closed loop embodiments, linearity correction may be achieved by using a non-linear model of the system in a feedback path of a control loop.

The non-linearity of a system, such as a digital microphone, can be modelled through accurate simulations that model the response of the MEMS device and readout circuit at different input sound wave pressures. Knowing the non-ideality of the transfer function of the digital system, it is possible to apply a correction in the digital domain with a nonlinear compensation component to obtain an output signal with an improved linearity with respect to an uncorrected digital system.

For clarity, a generalized digital system transfer function is shown in FIG. 1, wherein an input voltage (VIN) to the digital system is represented on the X-axis, and an output voltage (VOUT) of the digital system is represented on the Y-axis. A straight dotted line 102 represents the ideal linear transfer function, wherein the entire system does not generate any nonlinearities. In an actual digital system, such as a digital microphone, nonlinearities exist that push the transfer function above (trace 104) and/or below (trace 106) the dotted line 102 representing the ideal transfer function. The nonlinearities can be digitally compensated by a nonlinear compensation component, which is configured to apply a nonlinear function to an input signal. In an embodiment, the nonlinear function may comprise an open loop fitting polynomial. The transfer function of the polynomial is inversely related to the non-ideal transfer function of the digital system, such that the product of the two transfer functions is linear. Second order and third order polynomials are described below.

For an embodiment nonlinear compensation component, a third order polynomial can be described by the equation: $VOUT=VIN+k1*VIN^2+k2*VIN^3$, wherein the coefficients k1 and k2 are determined by measuring the output total harmonic distortion THD0, wherein THD0 is the uncompensated total harmonic distortion THD measured at the output of the digital system. Once the characteristics of THD0 are measured, the coefficients k1 and k2 can be adjusted such that the transfer function of the digital system is linear and the THD is improved with respect to THD0. In an embodiment, the THD0 measurements and adjustment of the coefficients k1 and k2 can be performed on a product including the digital system during system test and before the product is shipped to the customer.

For another embodiment nonlinear compensation component, a second order polynomial can be described by the equation: $VOUT=VIN+k1*VIN^2$, wherein the coefficient k2 is similarly determined by measuring THD0, wherein THD0 is the uncompensated THD measured at the output of the digital system. Once the characteristics of THD0 are measured, the coefficient k1 can be adjusted such that the transfer function of the digital system is linear and the THD is improved with respect to THD0. In an embodiment, the THD0 measurements and adjustment of the coefficient k1 can be performed on a product including the digital system during fabrication and before the product is shipped to the customer.

The digital nonlinear compensation component thus associates at each input voltage value a corresponding corrected output tracking the ideal linear desired behavior of the digital system. The digital correction function is obtained with a fitting polynomial that can be second order or third order, and is made as low of an order as possible to in order to reduce system complexity. Higher order polynomials can also be used if desired in some embodiments.

As the non-linearity of the digital system is strongly process dependent it is desirable to adjust or optimize the polynomial to cover the process variations. Different coefficients and different order polynomials can be used for different digital systems. The choice of the proper correction function is performed in a calibration of the digital system, such as a digital microphone, and is based on the measurement of the system THD0 without compensation applied. A very accurate modelling of the system is desired when building the correction functions, as the method relies on the prediction of the distortion introduced by the digital specific system. In embodiments, the measured effect on an existing digital system product can result in a THD reduction on the order of 20 dB.

Figure 2:
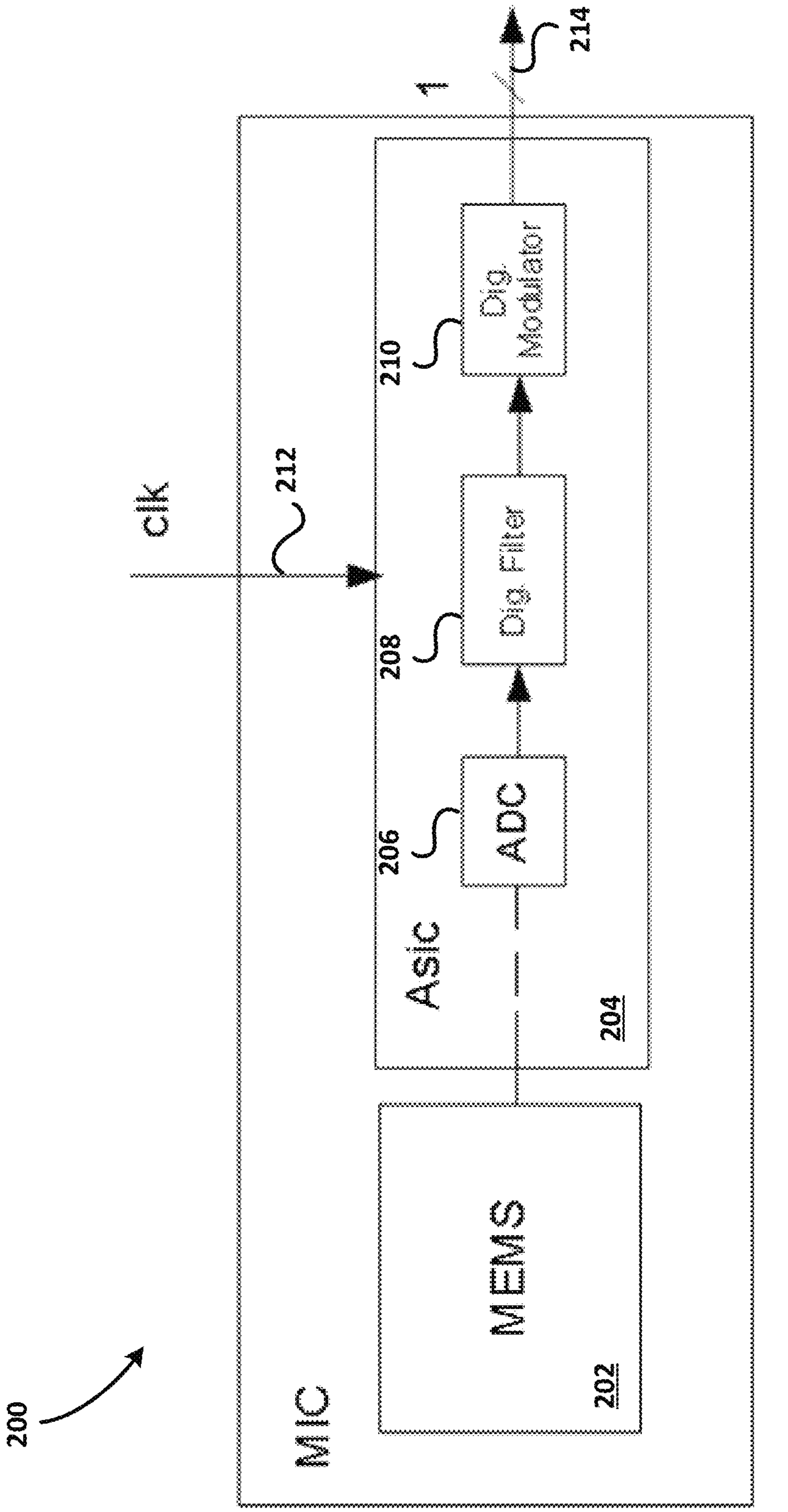
FIG. 2 is a block diagram of an exemplary digital microphone.

FIG. 2 shows a block diagram of an exemplary uncompensated digital microphone 200 including a MEMS device 202, which can be a capacitive MEMS device that generates an analog voltage in response to received sound waves. The analog voltage 203 is received by an Application-Specific Integrated Circuit (ASIC) 204, which includes an ADC 206, a digital filter 208, and a digital modulator 210, and which receives a clock clk 212. The ADC 206 converts the analog voltage into a digital output signal 207, which is then filtered by digital filter 208. ADC 206 can be a sigma-delta ADC or other type of ADC. Digital filter 208 may include an integrator and other filtering circuitry, such as noise-shaping circuitry. The output of digital filter 208 is coupled to digital modulator 210, which converts the digital output signal of digital filter 208 into a one-bit digital signal. The one-bit digital signal is an output signal at one-bit output bus 214.

Figure 3:
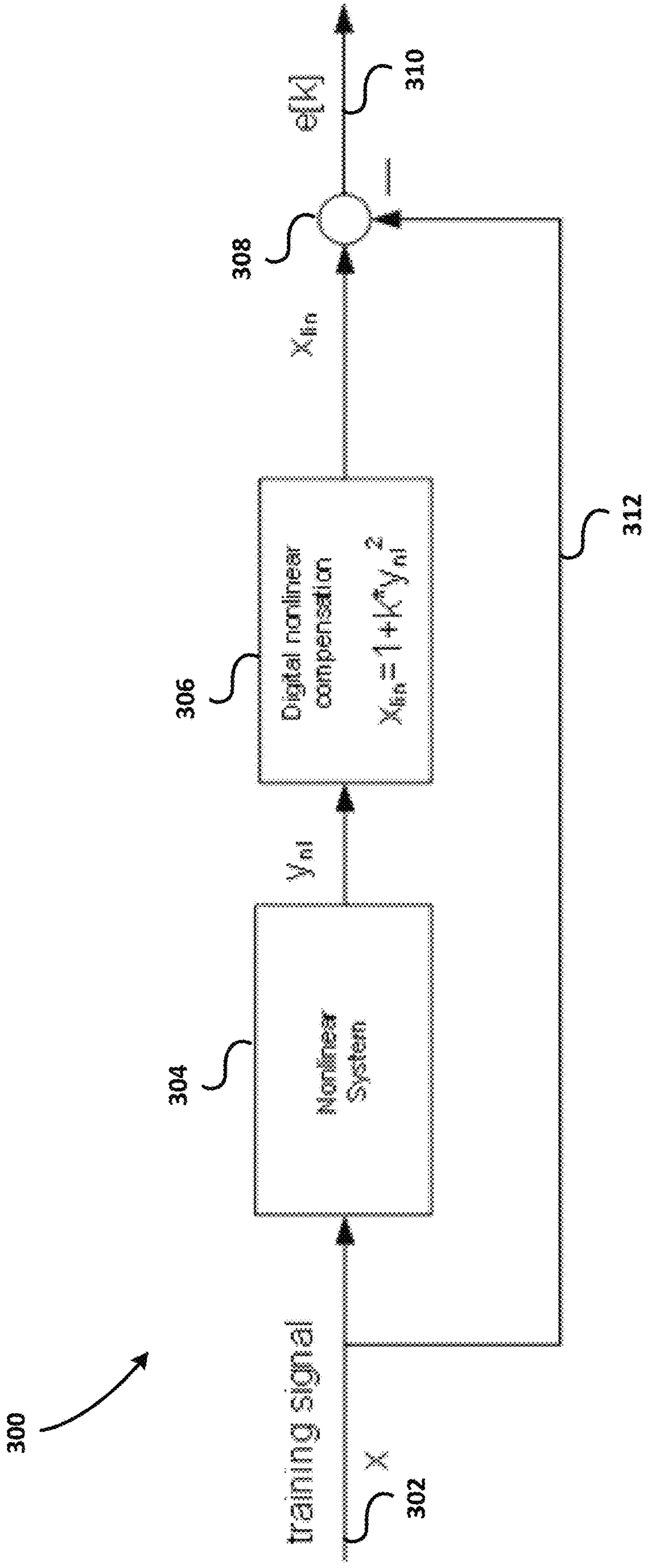
FIG. 3 is a block diagram of a digital microphone including digital nonlinear compensation functionality, according to an embodiment.

FIG. 3 shows a block diagram of a compensated digital microphone 300 including nonlinear digital compensation functionality, according to an embodiment. Digital microphone 300 includes MEMS device 202, ADC 206, digital filter 208, and digital modulator 210, previously shown and described. The output signal e[k] at output bus 314 is a digital output signal that is compensated for nonlinearities. The output signal on output bus 314 has lower distortion when compared to the distortion characteristics of exemplary uncompensated digital microphone 200. The nonlinearities are generated by MEMS device 202 and/or the readout circuitry of ASIC 304, which can include ADC 206. Nonlinear compensation component 310 can comprise an open loop nonlinear compensation component or a closed loop nonlinear compensation component, both of which are used to compensate system nonlinearities and are described in greater detail below. The output ($x_{lin}$) of the nonlinear compensation component 306 is coupled to a positive input of summer 308, the input 302 (training signal x) of the compensated digital microphone 300 is coupled to an input of ASIC 304 and to a negative input of summer 308 through path 312. The output of summer 308 is coupled to output bus 310.

While the above compensation embodiments provide significant benefits when compared to uncompensated digital microphones and nonlinear systems, the nonlinear compensation component coefficients are determined during an initial calibration phase that may include a training signal. The training signal is a signal that scans the appropriate frequency range in a specific sequence so that the coefficients can be properly determined. The initial calibration phase may occur after fabrication of the nonlinear system, but before the nonlinear system is placed in a normal operating mode. Thus, the choice of the proper correction function of the nonlinear compensation component is performed in the calibration phase of the digital microphone or nonlinear system, and is based on the measurement of the system total harmonic distortion (THD) without the compensation being applied. A very accurate modelling of the nonlinear system is thus needed when building the correction function, as the above method relies on the accurate prediction of the distortion introduced by a specific nonlinear system. As the non-linearity of the system is often strongly process dependent, and may even change over time and in response to environmental effects, a more flexible compensation method may be desirable in some applications that addresses these process variations, aging, and environmental effects.

According to embodiments, an adaptive calibration apparatus, system and method for a nonlinear compensation component is described in detail below. The embodiment calibration method simplifies the calibration process and also enables periodic or continuous calibration during a normal operational mode. The non-linearity generated by a nonlinear system comprising a MEMS device and readout circuitry is compensated in the digital signal processing path. For the adaptation/calibration of the optimal parameters (coefficients), no specific training signal and no specific calibration phase is needed.

Figure 4:
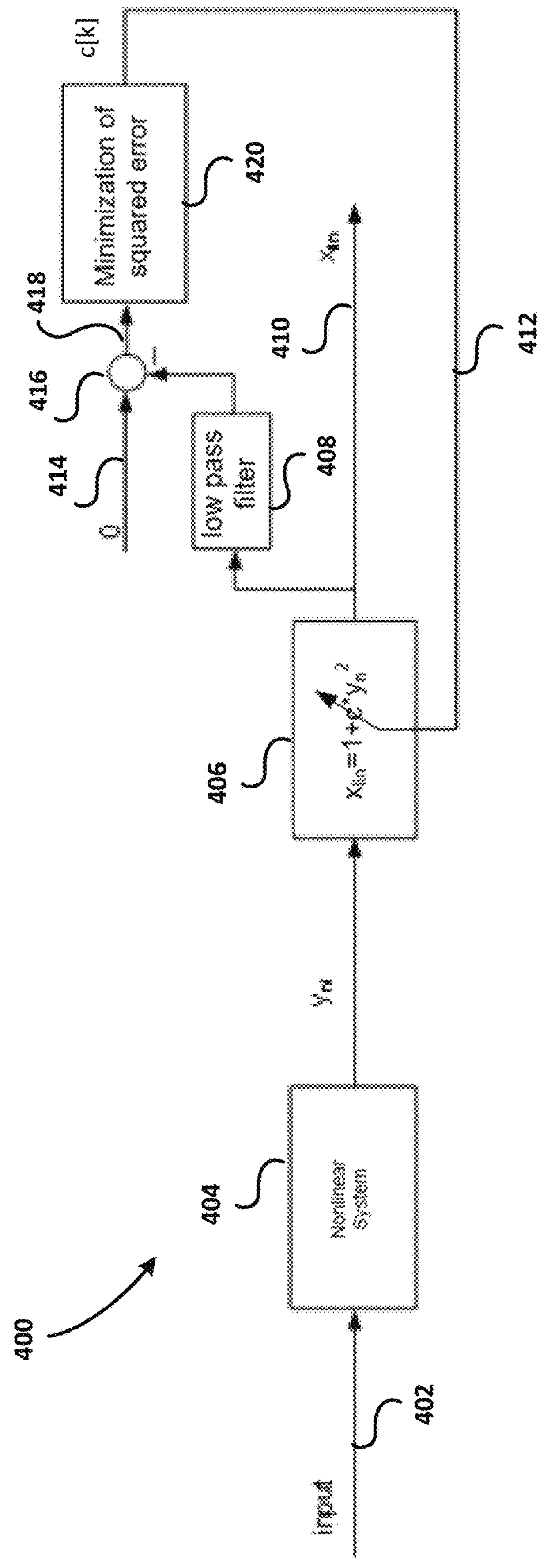
FIG. 4 is a block diagram of a nonlinear system having an adaptive nonlinear compensation component according to an embodiment.

FIG. 4 is a block diagram of a linearized system 400 having an adaptive nonlinear compensation component 406 according to an embodiment. The linearized system 400 comprises a nonlinear system 404 configured for receiving an input signal at input node 402, and an adaptive digital nonlinear compensation component 406 having an input coupled to the nonlinear output ($y_{nl}$) of the nonlinear system 404, and having an output 410 for generating a linearized output signal ($x_{lin}$). In an embodiment, the nonlinear system 404 comprises a digital microphone. Linearized system 400 further comprises a low pass filter 408 having an input coupled to the output of the digital nonlinear compensation component 406, a summer 416 having a positive input 414 configured for receiving a digital reference value (a logic zero value in an embodiment) and a negative input coupled to an output of low pass filter 408, and an error minimization component 420 having an input 418 coupled to an output of summer 416, and an output coupled 412 to the digital nonlinear compensation component 406.

The transfer function of the nonlinear compensation component 406 is a second order polynomial transfer function described by the following equation:

$$x_{lin}=1+c_1[k]*y_{nl}^2.$$

The coefficient $c_1[k]$ of the second order term is continually updated by the action of the error minimization component 420 that is in communication with the digital nonlinear compensation component 406. Error minimization component 420 receives an error signal and generates the adapted $c_1[k]$ coefficient based on the error signal. The error minimization function of the error minimization component 420 will be explained in further detail below. A second order polynomial transfer function is used because the squaring function will always provide a non-zero positive error signal (which can also be considered an "offset") no matter what type of input signal is presented to the linearized system.

Figure 5:
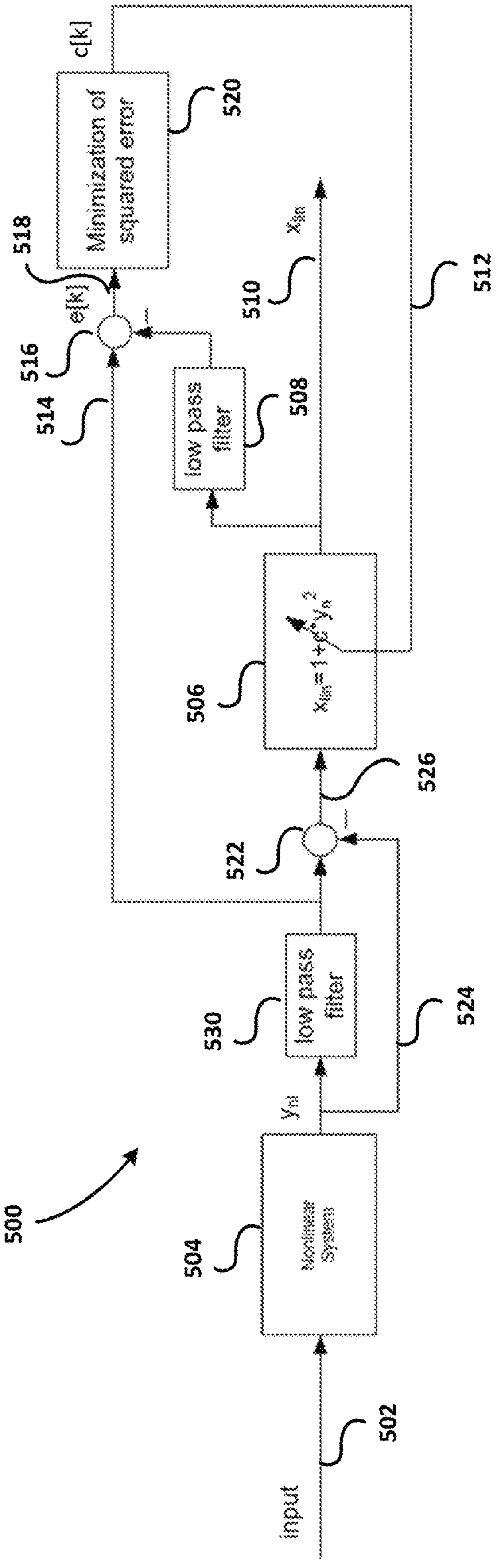
FIG. 5 is a block diagram of a nonlinear system having an adaptive nonlinear compensation component according to another embodiment.

FIG. 5 is a block diagram of a linearized system 500 having an adaptive nonlinear compensation component 506 as well as offset compensation according to another embodiment. The linearized system 500 comprises a nonlinear system 504 configured for receiving an input signal at input node 502 and for generating a nonlinear output signal ($y_{nl}$). In an embodiment, the nonlinear system 504 comprises a digital microphone. Linearized system 500 further comprises a first low pass filter 530 having an input coupled to an output of the nonlinear system 504, a first summer 522 having a positive input 524 coupled to an output of the first low pass filter 530 and having a negative input coupled to the output of the nonlinear system 504, and a digital nonlinear compensation component 506 having an input 526 coupled to an output of the first summer 522, and having an output 510 for generating a linearized output signal ($x_{lin}$). Linearized system 500 further comprises a second low pass filter 508 having an input coupled to the output of the digital nonlinear compensation component 506, a second summer 516 having a positive input 514 coupled to of the first low pass filter 530, and having a negative input coupled to an output of the second low pass filter 508, and an error minimization component 520 having an input 518 coupled to an output of the second summer 516, and an output 512 coupled to the digital nonlinear compensation component 506.

The transfer function of the nonlinear compensation component 506 is a second order polynomial transfer function described by the following equation:

$$x_{lin}=1+c_2[k]*y_{nl}^2.$$

The coefficient $c_2[k]$ of the second order term is continually updated by the action of the error minimization component 520 that is in communication with the digital nonlinear compensation component 506. Error minimization component 420 receives an error signal e[k] and generates the adapted $c_2[k]$ coefficient based on the error signal e[k]. The error minimization function of the error minimization component 520 will be explained in further detail below.

Figure 6A:
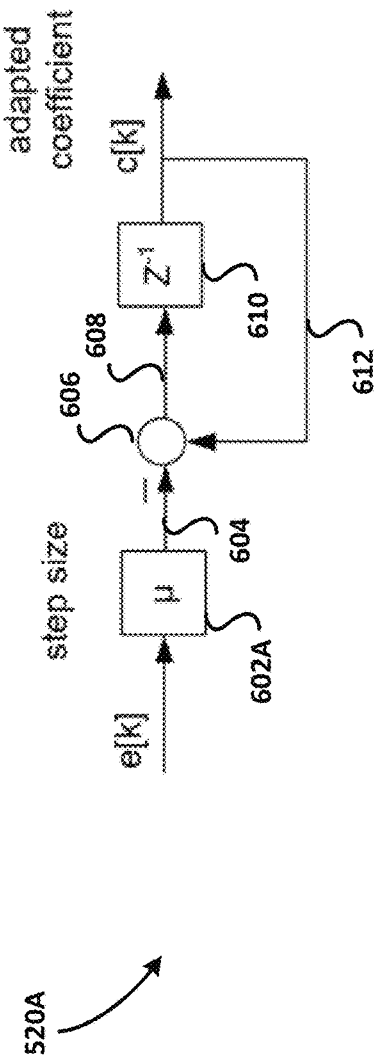
FIGS. 6A and 6B are block diagrams of an error minimization component suitable for use in the adaptive nonlinear compensation component of FIGS. 4 and 5.
Figure 6B:
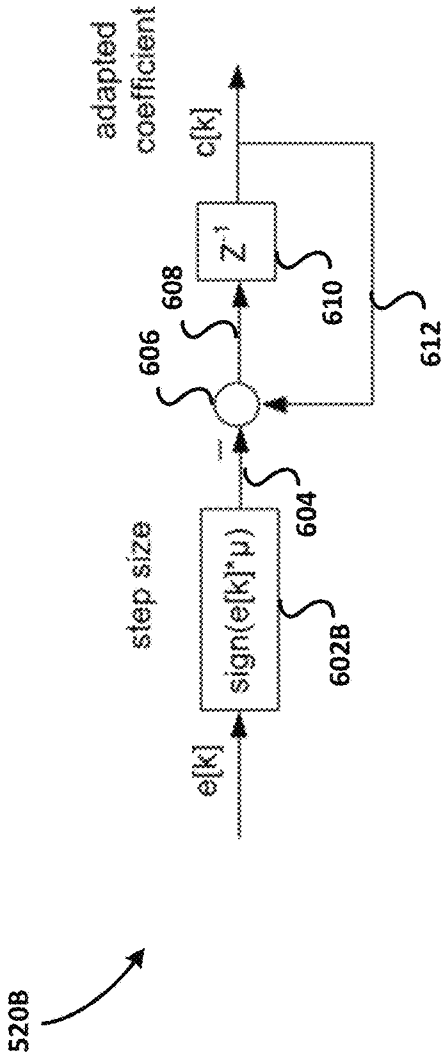

FIGS. 6A and 6B are block diagrams of embodiments of the error minimization component 520 suitable for use in the adaptive nonlinear compensation component 406 of FIG. 4 and the adaptive nonlinear compensation component 506 of FIG. 5.

FIG. 6A is a block diagram of an error minimization component 520A, according to a first embodiment. Error minimization component 520A comprises a step size generator 602A having an input configured for receiving an error signal e[k], a summer 606 having a positive input 604 coupled to the output of the step size generator through feedback path 612, and an integrator 610 having an input 608 coupled to an output of the summer 606 and an output coupled to a negative input of the summer 606, wherein the output of integrator 610 is configured for generating the adapted coefficient c[k]. In an embodiment, step size generator 602A is configured for generating a constant step size "μ", although decreasing step sizes can also be used. In an embodiment, step size generator can comprise a memory or register in a microprocessor. In an embodiment, integrator 610 can comprise a plurality of coupled registers or a switched-capacitor circuit.

FIG. 6B is a block diagram of an error minimization component 520B, according to a second embodiment. The input receives an error signal e[k] and generates and adapted coefficient c[k] as previously described. Summer 606 and integrator 610 are used in the same configuration, which has been previously described. However, a different step size generator 602B is used. In FIG. 6B, the step size generator 602B is configured for generating a step size comprising a function of the error signal e[k] and the constant step size "μ." In an embodiment, the step size is generated according to the function sign(e[k]*μ), which decreases as the error signal decreases. Other functions of the error signal e[k] and the constant step size "μ" can also be used in some embodiments.

Figure 7:
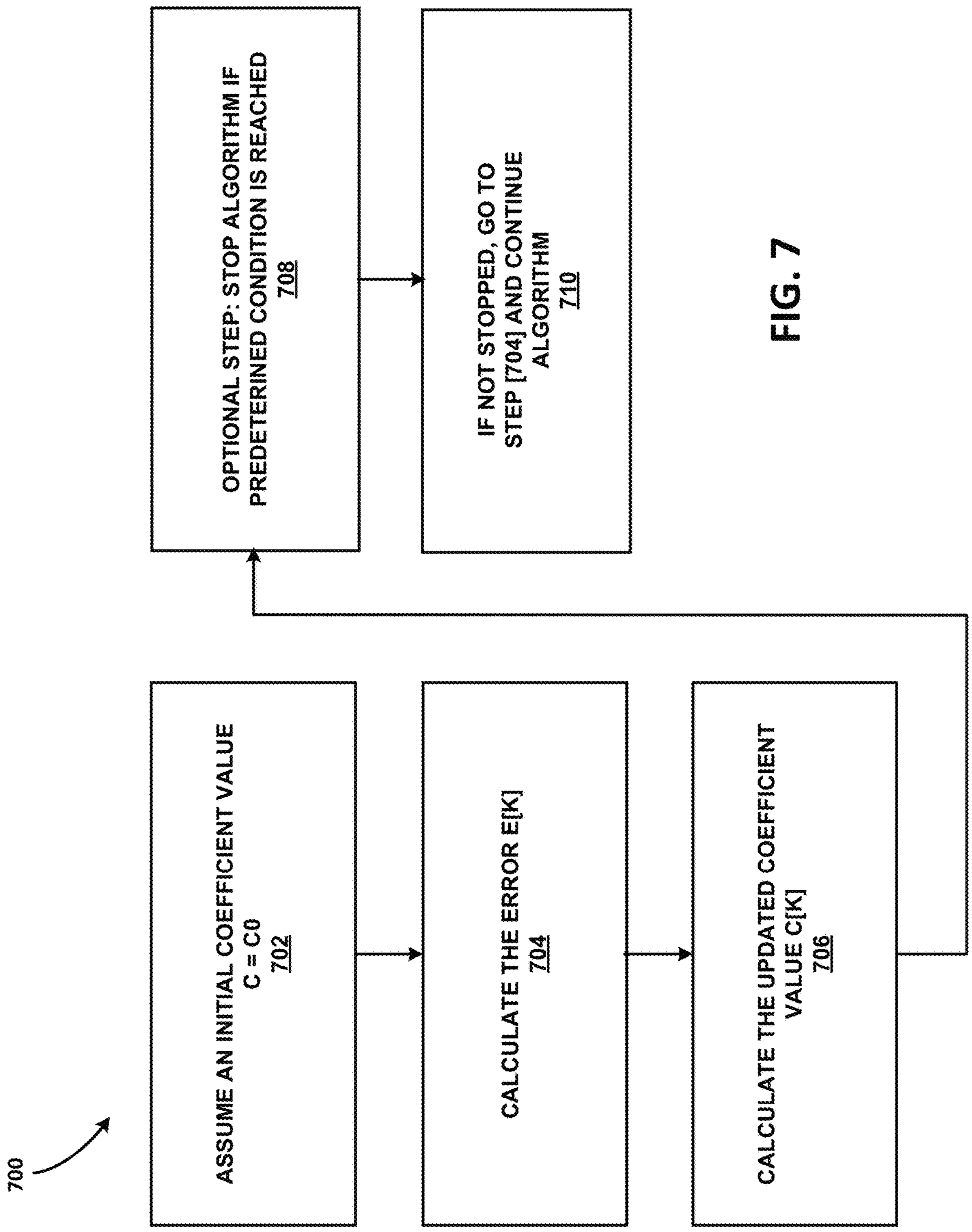
FIG. 7 is a flow chart of an algorithm for minimizing an error function and optimizing an adaptive coefficient of the adaptive nonlinear compensation component of FIGS. 4 and 5.

FIG. 7 is a flow chart of an algorithm 700 for minimizing an error function and optimizing an adaptive coefficient of the adaptive nonlinear compensation components of FIGS. 4 and 5. At step 702 an initial coefficient value is assumed, wherein "c0" is the initial value of the adaptive coefficient c[0]. A nominal value or an estimated initial value can be used, as the adaptive coefficient will change from the "c0" value to increasingly more optimum values c[k] as the algorithm iterates. At step 704 the error signal e[k] is calculated by the action of the error minimization component. At step 706 an updated coefficient value c[k] is calculated by the step size generator. For example, if step size generator 602A of FIG. 6A is used, then the iteration formula for c[k] is c[k]=c[k−1]−μ*e[k], wherein c[k] is the present value of the adaptive coefficient c[k], c[k−1] is the previous value of the adaptive coefficient, "μ" is the constant step size, e[k] is the present value of the error signal, and "k" is the present time or sample number. Other formulas can be used, for example with the formula given previously with respect to step size generator 602B shown in FIG. 6B. At optional step 708, algorithm 700 can be stopped if any parameter of the linearized system reaches a predetermined value. For example, if the error signal e[k] or the coefficient value c[k] reaches a predetermined value then algorithm 700 may be stopped. If desired, algorithm 700 can be restarted at a later time during the operation of the linearized system. Other parameters such as total harmonic distortion (THD) or other any other relevant parameter can be used, in other embodiments. If the predetermined value is not reached then algorithm 700 continues at step 710, which directs the algorithm to iterate starting at step 704.

Figure 8:
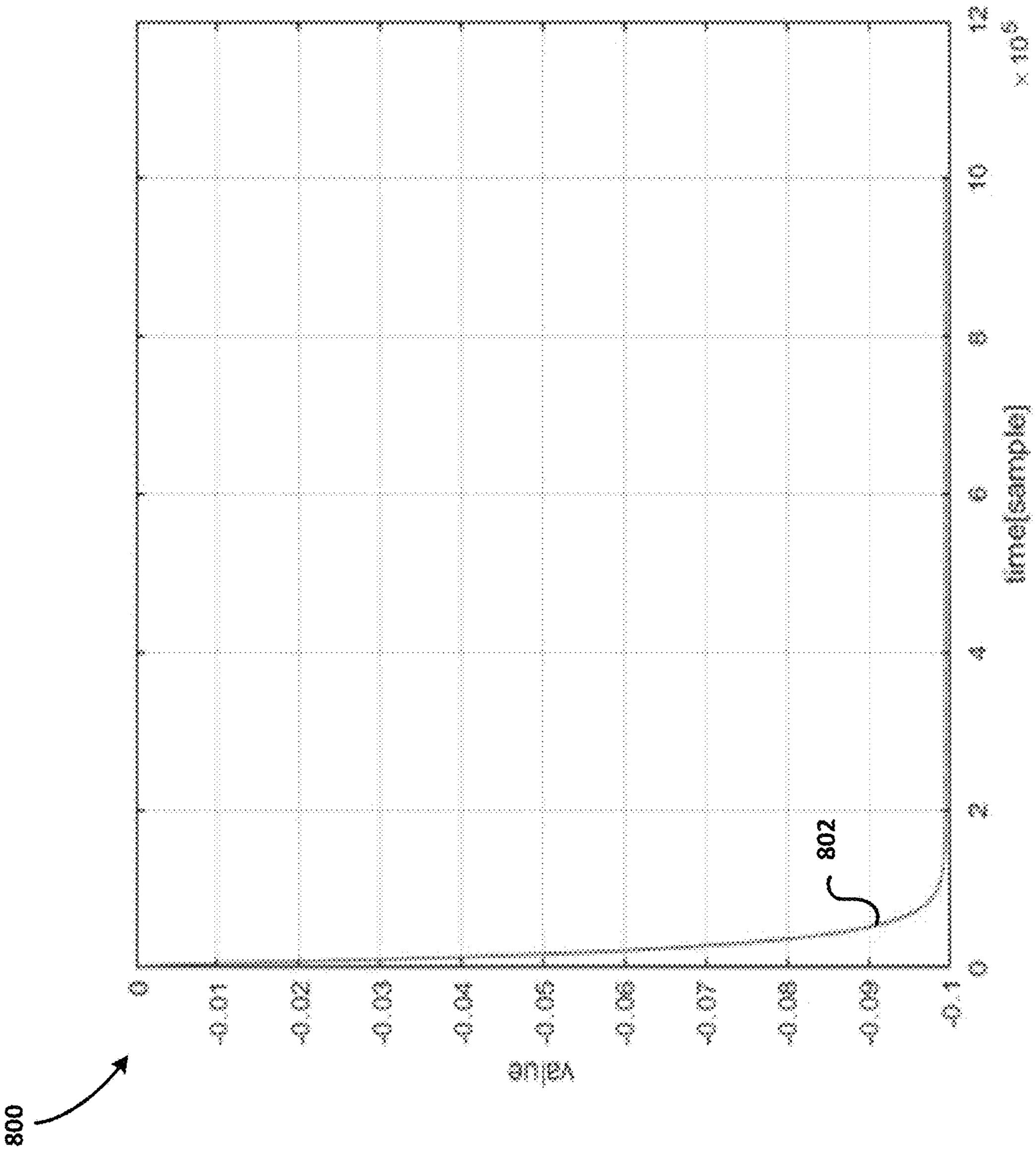
FIG. 8 is a diagram of an adaptive coefficient over time of the adaptive nonlinear compensation component of FIGS. 6A and 6B.

FIG. 8 is a diagram 800 of an adaptive coefficient value 802 over time or sample value [k] of the adaptive nonlinear compensation components of FIGS. 6A and 6B. During an initial time period of the algorithm 700 previously described, the coefficient value changes rapidly from an initial time or sample value and then asymptotically converges to a final value at a later time or sample value. The later time or sample value is determined by the specific embodiment of the linearized system 400 or 500 used and on the specific environmental conditions present. The adaptive coefficient value 802 can move from the final value if any of the components in the linearized system change characteristics, or if environmental conditions change. In such cases, algorithm 700 will continue to iterate to establish a new final value of the adaptive coefficient.

Figure 9:
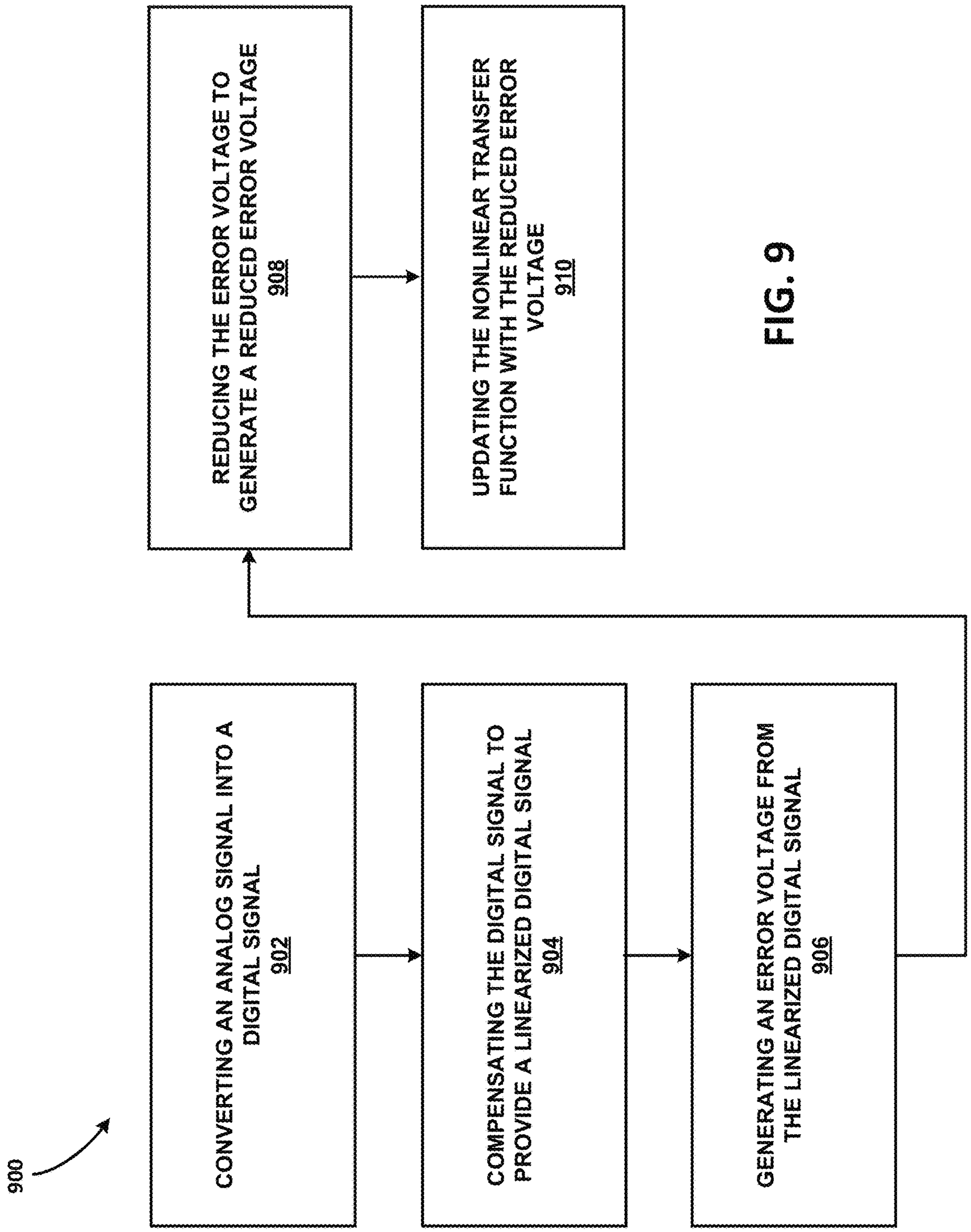
FIG. 9 is a flow chart of a nonlinearity compensation method for a nonlinear system according to an embodiment.

FIG. 9 is a flow chart of a nonlinearity compensation method 900 for a nonlinear system according to an embodiment. Nonlinearity compensation method 900 comprises converting an analog signal into a digital signal, wherein the analog signal includes nonlinearities at step 902; compensating the digital signal using a nonlinear transfer function fitted to the nonlinearities in the analog signal to provide a linearized digital signal at step 904; generating an error voltage from the linearized digital signal at step 906; reducing the error voltage to generate a reduced error voltage at step 908; and updating the nonlinear transfer function with the reduced error voltage.

Figure 10:
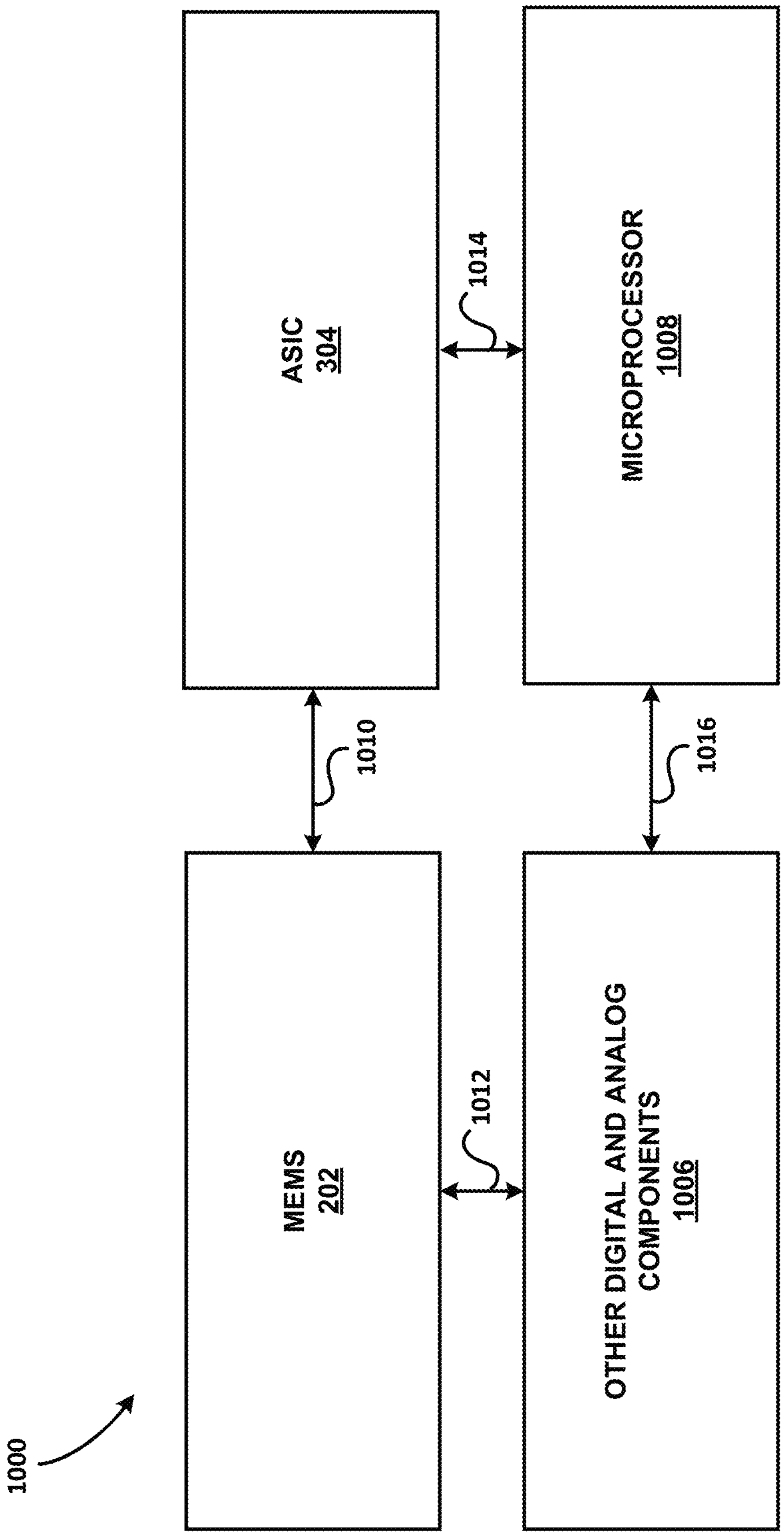
FIG. 10 is a block diagram of a compensated nonlinear system according to an embodiment.

FIG. 10 is a block diagram of a linearized system 1000 according to an embodiment. Linearized system 1000 includes MEMS device 202 and ASIC 304, previously described, that are in communication via bidirectional bus 1010. MEMS 202 and ASIC 304 can be packaged together to form a single digital product, such as a digital microphone. In some embodiments, linearized system 1000 can also include other digital and analog components 1006, such as additional filters, amplifiers, and other similar components. The other digital and analog components 1006 can communicate with MEMS device through bidirectional bus 1012. In some embodiments, linearized system 1000 can also include a microprocessor 1008, which can communicate with ASIC 304 and the other digital and analog components 1006 through bidirectional buss 1014 and bidirectional buss 1016. For example, microprocessor 1008 can generate clock signals and receive data from ASIC 304. In other embodiments, microprocessor 1008 can provide the functionality of digital or software components that would otherwise be resident on ASIC 304.

In some embodiments ASIC 304 can comprise a single integrated circuit, two or more integrated circuits, individual digital and analog components, processors, or a combination thereof. In some embodiments MEMS device 202 can comprise a capacitive MEMS device fabricated out of silicon, and having one or more flexible membranes, and one or more fixed membranes.

Example embodiments of the present invention are summarized here. Other embodiments can also be understood from the entirety of the specification and the claims filed herein.

Example 1. According to an embodiment, an apparatus includes a nonlinear system configured for receiving an input signal; a digital nonlinear compensation component having an input coupled to an output of the nonlinear system, and having an output for generating an output signal; a low pass filter having an input coupled to the output of the digital nonlinear compensation component; a first summer having a first input configured for receiving a digital reference value and a second input coupled to an output of the low pass filter; and an error minimization component having an input coupled to an output of the first summer, and an output coupled to the digital nonlinear compensation component.

Example 2. The apparatus of Example 1, wherein the digital nonlinear compensation component includes a second order transfer function.

Example 3. The apparatus of any of the above examples, wherein the second order transfer function includes an adapted second order coefficient.

Example 4. The apparatus of any of the above examples, wherein the digital reference value includes a logic zero value.

Example 5. The apparatus of any of the above examples, wherein the error minimization component includes a step size generator having an input configured for receiving an error signal from the first summer; a second summer having a first input coupled to an output of the step size generator; and an integrator having an input coupled to an output of the second summer and an output coupled to a second input of the second summer, wherein the output of the integrator is configured for generating an adapted coefficient.

Example 6. The apparatus of any of the above examples, wherein the step size generator is configured for generating a constant step size.

Example 7. The apparatus of any of the above examples, wherein the step size generator is configured for generating a step size including a function of the error signal.

Example 8. The apparatus of any of the above examples, wherein the nonlinear system includes a digital microphone.

Example 9. According to an embodiment, an apparatus includes a nonlinear system configured for receiving an input signal; a first low pass filter having an input coupled to an output of the nonlinear system; a first summer having a first input coupled to an output of the first low pass filter, and having a second input coupled to the output of the nonlinear system; a digital nonlinear compensation component having an input coupled to an output of the first summer, and having an output for generating an output signal; a second low pass filter having an input coupled to the output of the digital nonlinear compensation component; a second summer having a first input coupled to of the first low pass filter, and having a second input coupled to an output of the second low pass filter; and an error minimization component having an input coupled to an output of the second summer, and an output coupled to the digital nonlinear compensation component.

Example 10. The apparatus of Example 9, wherein the digital nonlinear compensation component includes a second order transfer function.

Example 11. The apparatus of any of the above examples, wherein the second order transfer function includes an adapted second order coefficient.

Example 12. The apparatus of any of the above examples, wherein the error minimization component includes a step size generator having an input configured for receiving an error signal from the first summer; a third summer having a first input coupled to an output of the step size generator; and an integrator having an input coupled to an output of the third summer, and having an output coupled to a second input of the third summer, wherein the output of the integrator is configured for generating an adapted coefficient.

Example 13. The apparatus of any of the above examples, wherein the step size generator is configured for generating a constant step size.

Example 14. The apparatus of any of the above examples, wherein the step size generator is configured for generating a step size including a function of the error signal.

Example 15. The apparatus of any of the above examples, wherein the nonlinear system includes a digital microphone.

Example 16. According to an embodiment, a method includes converting an analog signal into a digital signal, wherein the analog signal includes nonlinearities; compensating the digital signal using a nonlinear transfer function fitted to the nonlinearities in the analog signal to provide a linearized digital signal; generating an error voltage from the linearized digital signal; reducing the error voltage to generate a reduced error voltage; and updating the nonlinear transfer function with the reduced error voltage.

Example 17. The method of any of the above examples, further including iteratively reducing the error voltage.

Example 18. The method of any of the above examples, wherein the error voltage is reduced until a predetermined minimum error voltage is attained.

Example 19. The method of any of the above examples, wherein reducing the error voltage includes iteratively reducing the error voltage by a fixed amount, or iteratively reducing the error voltage by an amount that is a function of the error voltage.

Example 20. The method of Example 16, wherein the nonlinear transfer function includes a second order transfer function.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus comprising:

a nonlinear system configured for receiving an input signal;

a digital nonlinear compensation component having an input coupled to an output of the nonlinear system, and having an output for generating an output signal;

a low pass filter having an input coupled to the output of the digital nonlinear compensation component;

a first summer having a first input configured for receiving a digital reference value and a second input coupled to an output of the low pass filter; and an error minimization component having an input coupled to an output of the first summer, and an output coupled to the digital nonlinear compensation component.

2. The apparatus of claim 1, wherein the digital nonlinear compensation component comprises a second order transfer function.

3. The apparatus of claim 2, wherein the second order transfer function comprises an adapted second order coefficient.

4. The apparatus of claim 1, wherein the digital reference value comprises a logic zero value.

5. The apparatus of claim 1, wherein the error minimization component comprises:

a step size generator having an input configured for receiving an error signal from the first summer;

a second summer having a first input coupled to an output of the step size generator; and an integrator having an input coupled to an output of the second summer and an output coupled to a second input of the second summer, wherein the output of the integrator is configured for generating an adapted coefficient.

6. The apparatus of claim 5, wherein the step size generator is configured for generating a constant step size.

7. The apparatus of claim 5, wherein the step size generator is configured for generating a step size comprising a function of the error signal.

8. The apparatus of claim 1, wherein the nonlinear system comprises a digital microphone.

9. An apparatus comprising:

a nonlinear system configured for receiving an input signal;

a first low pass filter having an input coupled to an output of the nonlinear system;

a first summer having a first input coupled to an output of the first low pass filter, and having a second input coupled to the output of the nonlinear system;

a digital nonlinear compensation component having an input coupled to an output of the first summer, and having an output for generating an output signal;

a second low pass filter having an input coupled to the output of the digital nonlinear compensation component;

a second summer having a first input coupled to the output of the first low pass filter, and having a second input coupled to an output of the second low pass filter; and an error minimization component having an input coupled to an output of the second summer, and an output coupled to the digital nonlinear compensation component.

10. The apparatus of claim 9, wherein the digital nonlinear compensation component comprises a second order transfer function.

11. The apparatus of claim 10, wherein the second order transfer function comprises an adapted second order coefficient.

12. The apparatus of claim 9, wherein the error minimization component comprises:

a step size generator having an input configured for receiving an error signal from the second summer;

a third summer having a first input coupled to an output of the step size generator; and an integrator having an input coupled to an output of the third summer, and having an output coupled to a second input of the third summer, wherein the output of the integrator is configured for generating an adapted coefficient.

13. The apparatus of claim 12, wherein the step size generator is configured for generating a constant step size.

14. The apparatus of claim 12, wherein the step size generator is configured for generating a step size comprising a function of the error signal.

15. The apparatus of claim 9, wherein the nonlinear system comprises a digital microphone.

* * * * *